US 11,274,733 B2

(12) United States Patent
De La Torre Morales

(10) Patent No.: US 11,274,733 B2
(45) Date of Patent: Mar. 15, 2022

(54) LINEAR TRANSLATION STAGES

(71) Applicant: 9363-8203 Québec Inc., Montréal (CA)

(72) Inventor: Maria Elena De La Torre Morales, Montréal (CA)

(73) Assignee: 9363-8203 QUÉBEC INC., Montréal (CA)

( * ) Notice: Subject to any disclaimer, the term of this patent is extended or adjusted under 35 U.S.C. 154(b) by 0 days.

(21) Appl. No.: 16/757,739

(22) PCT Filed: Oct. 23, 2018

(86) PCT No.: PCT/CA2018/051342
§ 371 (c)(1),
(2) Date: Apr. 20, 2020

(87) PCT Pub. No.: WO2019/079892
PCT Pub. Date: May 2, 2019

(65) Prior Publication Data
US 2021/0190184 A1    Jun. 24, 2021

Related U.S. Application Data

(60) Provisional application No. 62/575,674, filed on Oct. 23, 2017.

(51) Int. Cl.
*F16H 25/20*    (2006.01)
*F16H 25/22*    (2006.01)

(52) U.S. Cl.
CPC ......... *F16H 25/20* (2013.01); *F16H 25/2003* (2013.01); *F16H 25/2204* (2013.01); *F16H 2025/204* (2013.01); *F16H 2025/2075* (2013.01)

(58) Field of Classification Search
CPC .............................................. F16H 2025/2078
See application file for complete search history.

(56) References Cited

U.S. PATENT DOCUMENTS

| 6,053,062 A | 4/2000 | Ishikawa et al. | |
|---|---|---|---|
| 7,802,488 B2 * | 9/2010 | Bucheton | B64C 25/30 74/89.23 |
| 2006/0096399 A1 * | 5/2006 | Harper | F16H 25/24 74/424.71 |
| 2009/0001837 A1 * | 1/2009 | Welle | H02K 7/06 310/156.12 |
| 2012/0019082 A1 * | 1/2012 | Won | H02K 7/083 310/49.01 |
| 2012/0186374 A1 * | 7/2012 | Schroeder | F16H 25/20 74/89.32 |
| 2013/0119786 A1 * | 5/2013 | Muramatsu | F16H 25/20 310/12.27 |
| 2016/0204672 A1 * | 7/2016 | Johnson | F16H 25/24 310/43 |
| 2016/0223127 A1 * | 8/2016 | Li | H02N 2/126 |

(Continued)

*Primary Examiner* — William Kelleher
*Assistant Examiner* — Gregory T Prather
(74) *Attorney, Agent, or Firm* — Bereskin & Parr LLP/S.E.N.C.R.L., s.r.l.

(57) ABSTRACT

A compact translation stage having a frame, a motor, a carriage, a translation screw and at least one guide is described herein. The carriage is slidably coupled to the guide and engages the screw. The screw is rotatably coupled to the motor. The motor is embedded in an inner volume of the screw and the screw rotates upon actuation of the motor to translate the carriage relative to the frame.

19 Claims, 9 Drawing Sheets

(56) References Cited

U.S. PATENT DOCUMENTS

| | | | | |
|---|---|---|---|---|
| 2016/0294253 | A1* | 10/2016 | Fukunaga | H02K 1/28 |
| 2017/0009858 | A1* | 1/2017 | Klode | F16H 25/2056 |
| 2017/0023078 | A1* | 1/2017 | Rehfus | F16D 65/186 |
| 2017/0102057 | A1* | 4/2017 | Aubin-Marchand | F16H 25/20 |
| 2018/0172122 | A1* | 6/2018 | Parmar | F16H 57/082 |
| 2018/0375406 | A1* | 12/2018 | Healey | H02K 5/1735 |
| 2019/0040940 | A1* | 2/2019 | Matsuto | F16H 25/2015 |
| 2020/0070612 | A1* | 3/2020 | Lee | B60G 15/065 |
| 2020/0300343 | A1* | 9/2020 | Bekircan | F16H 25/2223 |

\* cited by examiner

LINEAR TRANSLATION STAGES

CROSS-REFERENCE TO RELATED APPLICATIONS

The present application is a 35 USC 371 national stage entry of PCT/CA2018/051342 filed on Oct. 23, 2018 and which claims priority to U.S. Application No. 62/575,674 filed on Oct. 23, 2017. These documents are hereby incorporated by reference in their entirety.

TECHNICAL FIELD

The embodiments disclosed herein relate to translation stages and, in particular to linear translation stages.

BACKGROUND

In three-dimensional space, an object may either rotate about, or translate along any of three axes. Therefore, an object is said to have six degrees of freedom (3 rotational and 3 translational) when in three-dimensional space.

A linear stage is part of a precise motion system that restricts motion of an object to be linear only. Linear stages generally include a platform and a base, joined by a guide or linear bearing to restrict the stage to linear motion with respect to the base.

Linear translation stages can be used to provide translational movement to mounted optical components for a range of optical applications. Linear translation stages use a number of different methods to achieve movement, generally including a motor coupled to screw to rotate the screw and stage (or carriage) coupled to the screw to translate linearly upon rotation of the screw. Ball bearings, rack and pinion, crossed roller, or leadscrew are examples of mechanisms for converting between the rotational motion of the screw and the linear translation motion of the stage.

Compact positioning stages are crucial for the miniaturization process in cutting-edge research and industrial applications such as testing and measurement, microscopy, semiconductor manufacturing, medical engineering, biotechnology, surface measurement technology, automation technology and component assembly. Reducing the footprint of linear translation stages has proven to be difficult as given the size and configuration of the required components. Currently, when compact translation stages are required for some applications, piezo-actuated linear stages are used. Piezo-actuated linear stages have some drawbacks however, such as lower push/pull force than motorized linear stages, the motion increment of piezo-actuated linear stages is dependent on the temperature, the carriage of a piezo-actuated linear stage can slip if a force is applied to the carriage, and piezo-actuated linear stages are noisy.

Accordingly, there is a need for a compact linear translation stage.

SUMMARY

According to some embodiments, a linear translation stage is provided. The linear translation stage includes a frame having a first end and a second end, at least one guide extending between the first end and the second end, and a carriage slidably coupled to the at least one guide. The linear translation stage further includes a motor fixed to the frame and a screw having threads on an outer surface thereof, the outer surface defining an inner volume of the screw, the screw being rotationally coupled to the motor and threadingly engaged with the carriage by a nut. The motor is embedded in the inner volume of the screw and actuating the motor rotates the screw to translate the carriage relative to the frame between the first end and the second end.

According to some embodiments, a method of manufacturing a linear translation stage is provided. The method includes slidably coupling a carriage to at least one guide of a frame of the linear stage, the at least one guide guiding translation of the carriage along the frame, inserting a screw thorough an aperture at a first end of the frame to rotatably couple the carriage to translate the carriage upon rotation of the screw, and inserting the motor into an inner volume of the screw through the aperture to embed the motor inside of the screw, the motor coupled to the screw so actuation of the motor rotates the screw.

According to some embodiments, a method of translating a carriage of a linear translation stage is provided. The method includes actuating a motor, the motor embedded in a screw and rotatably coupled to the screw that converts rotation of a portion of the motor into rotation of the screw, and rotating the screw, the screw rotatably coupled to the carriage by a nut that converts rotation of the screw into translation of the carriage.

According to some embodiments, a method of manufacturing a linear translation stage, the method comprising:
slidably coupling a carriage to at least one guide of a frame of the linear translation stage, the at least one guide guiding translation of the carriage along the frame;
providing a screw extending between a first end of the frame and a second end of the frame to rotatably couple to the carriage to translate the carriage upon rotation of the screw; and
inserting the motor into an inner volume of the screw, the motor coupled to the screw so actuation of the motor rotates the screw.

According to some embodiments, a method of translating a carriage of a linear translation stage, the method comprising:
actuating a motor embedded in a screw, the motor rotatably coupled to the screw that converts rotation of a rotor of the motor into rotation of the screw; and
rotating the screw, the screw rotatably coupled to the carriage by a nut that converts rotation of the screw into translation of the carriage.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
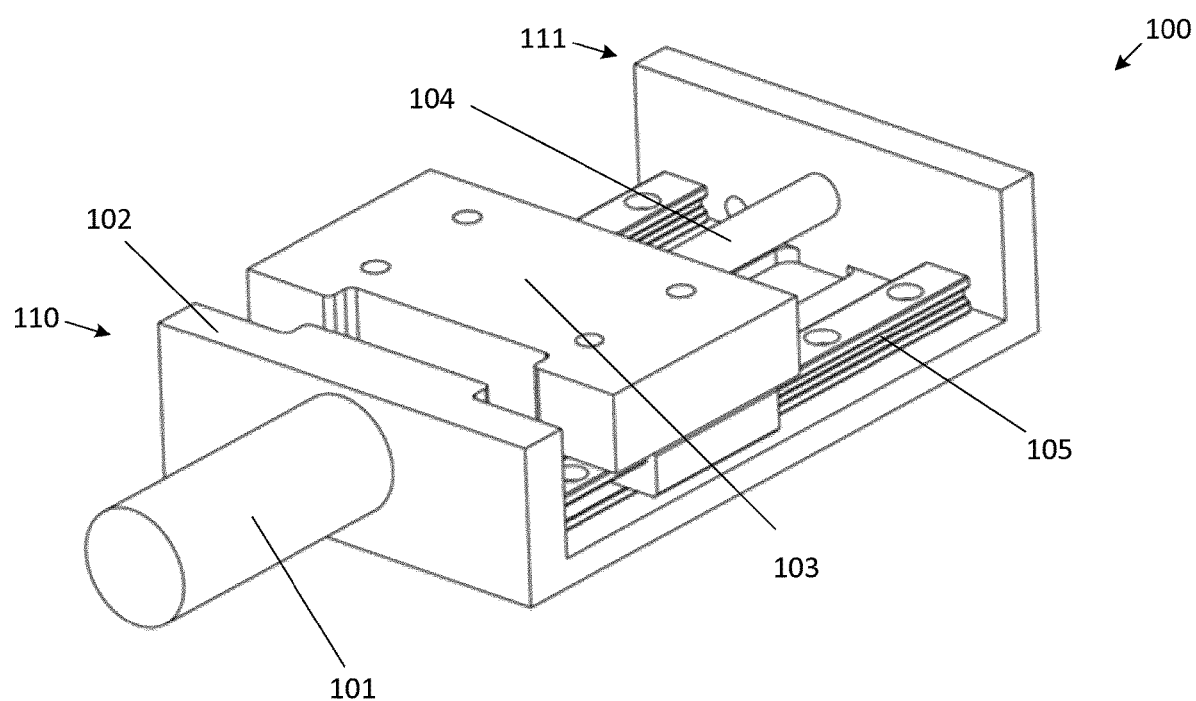
FIG. 1 is an isometric view of a prior art linear stage where the motor is positioned outside of a frame of the linear stage and coupled directly to the translation screw.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

Described herein are embodiments of a motorized translation stage that provides linear motion to a carriage of the translation stage by guide rails and a drive mechanism.

According to some embodiments, the screw is rotationally coupled to the motor by a coupling.

According to some embodiments, at least a portion of the coupling is configured to surround an outer surface of a shaft of the motor.

According to some embodiments, the coupling is configured to rotate with rotation of the shaft of the motor.

According to some embodiments, the coupling is flexible by the use of flexures or a flexible material.

According to some embodiments, the screw is mounted on bearings that guide the rotational motion of the screw upon actuating the motor.

According to some embodiments, the at least one guide is composed of two rails spaced apart from each other.

According to some embodiments, the nut is fixed to the carriage and converts rotational motion of the screw into translation of the carriage.

According to some embodiments, the nut has threads that are complementary to the threads on the outer surface of the screw.

According to some embodiments, the nut material is brass, bronze, aluminum, plastic, or any other appropriate material. The nut may have an anti-backlash mechanism. The anti-backlash mechanism may be a flanged type, a straight type or a block type anti-backlash mechanism.

According to some embodiments, the motor is partially embedding in the inner volume of the screw.

According to some embodiments, the motor is one of a stepper motor, a DC motor, brushed or brushless, with or without encoder, with or without a gearhead.

According to some embodiments, the linear guides are one of a cross roller bearing, a linear ball bearing, a ball cage and/or a rod bearing.

According to some embodiments, the screw can be a lead screw, a ball screw or any other appropriate type of screw for converting a rotational motion into a linear motion of the carriage.

According to some embodiments, the screw can have right hand or left hand threads.

According to some embodiments, the screw has a thread profile as per Unified National (UN) or ISO 60 degrees V-shaped thread profile, ACME, trapezoidal buttress, square, Whitworth or other thread profile.

According to some embodiments, the screw thread can have a fine or a coarse pitch.

According to some embodiments, the screw can have a combination of two or more different pitches, two or more different diameters, and two different thread sides (left hand and right hand) used with two or more carriages moved under the rotation of the screw.

According to some embodiments, the carriage has a travel of about 5 mm to about 50 mm.

According to some embodiments, the carriage has a travel of about 15 mm to about 35 mm.

According to some embodiments, the carriage has a travel of about 25 mm.

According to some embodiments, the linear stage has a length in a range of about 20 mm to about 100 mm.

According to some embodiments, the linear stage has a width in a range of about 15 mm to about 50 mm.

According to some embodiments, the linear stage has a height in a range of about 10 mm to about 50 mm.

According to some embodiments, the linear stage has a length of about 60 mm, a width of about 35 mm and a height of about 20 mm.

According to some embodiments, the linear stage has a length of about 60 mm, a width of about 46 mm and a height of about 23 mm.

According to some embodiments, slidably coupling carriage to the at least one guide of the frame can include inserting each of two guide rails into a respective sleeve and then inserting both the sleeves and respective guide rails into a respective portion of the carriage.

According to some embodiments, inserting the screw through an aperture of the frame can include inserting the screw through an aperture of the frame into a hub positioned adjacent to the aperture.

According to some embodiments, inserting the screw through the aperture of the frame and into the hub can provide for the screw to be parallel to each of the two guide rails.

According to some embodiments, inserting the screw through the aperture of the frame and into the hub can provide for the screw to be laterally spaced in a same direction from each of the two guide rails.

According to some embodiments, the motor can be coupled to the screw by a coupling that transfers the rotational motion of the motor to the screw.

According to some embodiments, the motor can be fixedly coupled to the frame by a motor mount.

Referring to FIG. 1, illustrated therein is a prior art translation stage 100 having a motor 101 coupled to a screw 104 via frame 102. Screw 104 extends between a first end 110 and a second end 111 of frame 102 and motor 101 is aligned with screw 104, adjacent to frame 102 (e.g. outside of or external to frame 102), and coupled to first end 110 of frame 102. Carriage 103 slidably engages two guiding rails 105, the two guiding rails 105 spaced apart from each other, positioned on either side of screw 104 and extending between first end 110 and second end 111. Carriage 103 is linearly translated across frame 102 upon rotation of screw 104 by motor 101. The linear motion of carriage 103 is guided by guiding rails 105.

The configuration of motor 101 shown in FIG. 1 significantly increases the size of the translation stage 100 as the overall length of the translation stage 100 is the sum of the length of frame 102 and the length of motor 101.

In response, some manufacturers have developed solutions such as folding the motor on the side or on the bottom of the stage. An example of this configuration is shown in FIG. 2.

Figure 2:
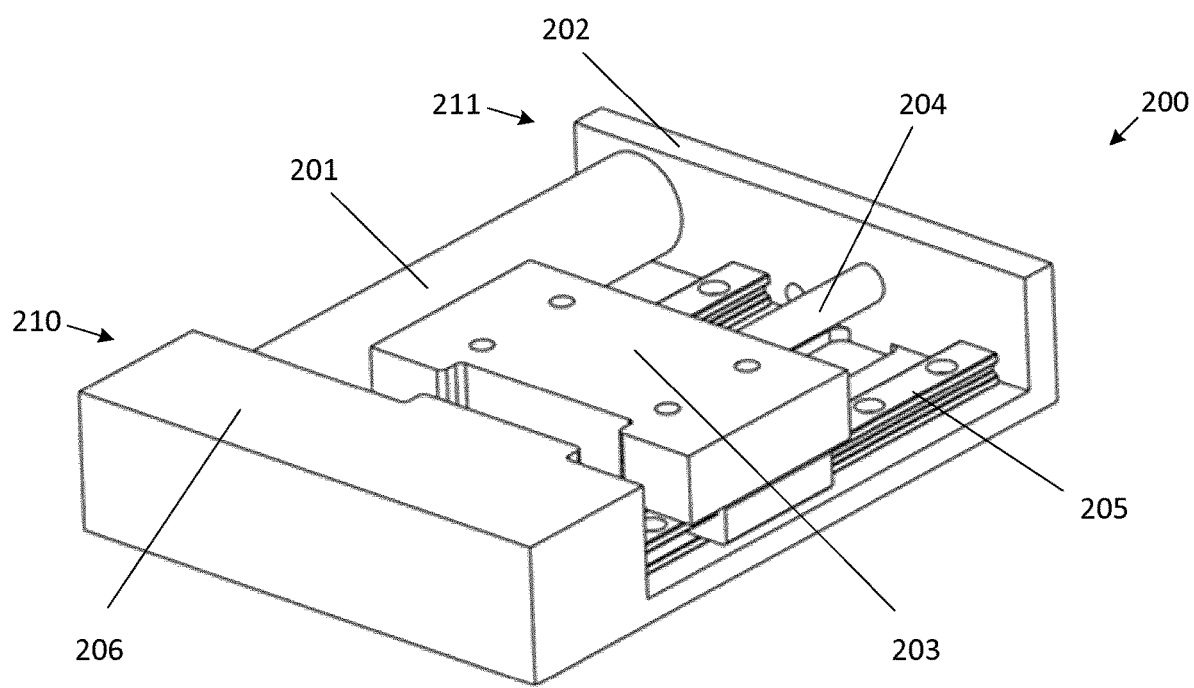
FIG. 2 is an isometric view of a prior art linear stage where the motor is folded on a side of the linear stage to reduce a length of the translation stage.

Referring to FIG. 2, illustrated therein is another prior art translation stage 200. Translation stage 200 also has a motor 201 coupled to a frame 202. A screw 204 is disposed between two guiding rails 205 and extends between a first end 210 and a second end 211 of frame 202. Guiding rails 205 are spaced apart from each other and also extend between first end 210 and second end 211 of frame 202. In this embodiment, motor 201 is positioned lateral to screw 204 and extends between first end 210 and second end 211 adjacent to one of the guiding rails 205 to no encumber translation of carriage 203 on guiding rails 205. Carriage 203 slidably engages guiding rails 205 positioned on either side of screw 204 and translates laterally across frame 202 upon rotation of screw 204 by motor 201. A hub 206 is positioned at first end 210 of frame 202 and couples to both screw 204 and motor 201.

The configuration shown in FIG. 2 reduces the length of the translation stage but has drawbacks, such as increasing the width of the stage (e.g. stage 200 is wider than stage 100) and increasing the mechanical complexity. Folded motorization such as shown in FIG. 2 requires the use of additional gears or belts that may affect the cost and may impact on the mechanism backlash, reducing the repeatability of the translation stage. Thus, the minimum size a motorized translation stage actuated by DC or stepper motor is limited.

Figure 3:
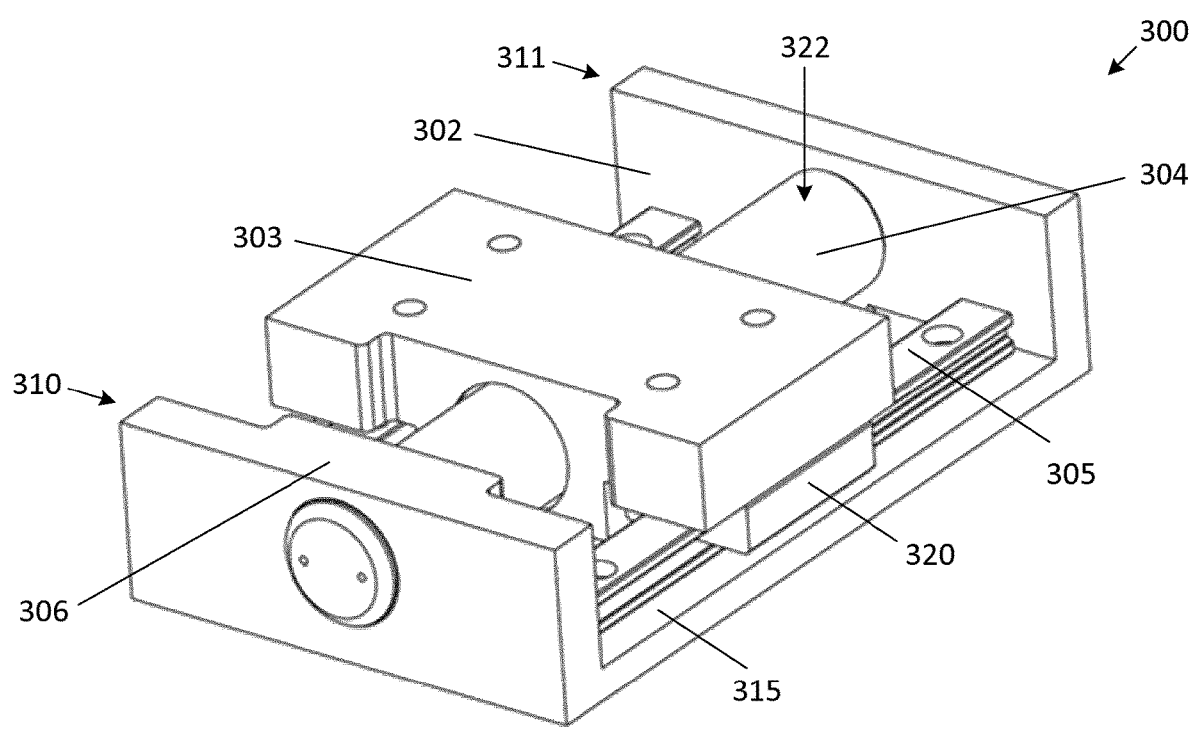
FIG. 3 is an isometric view of a translation stage having a motor embedded inside the translation screw, according to one embodiment.
Figure 5:
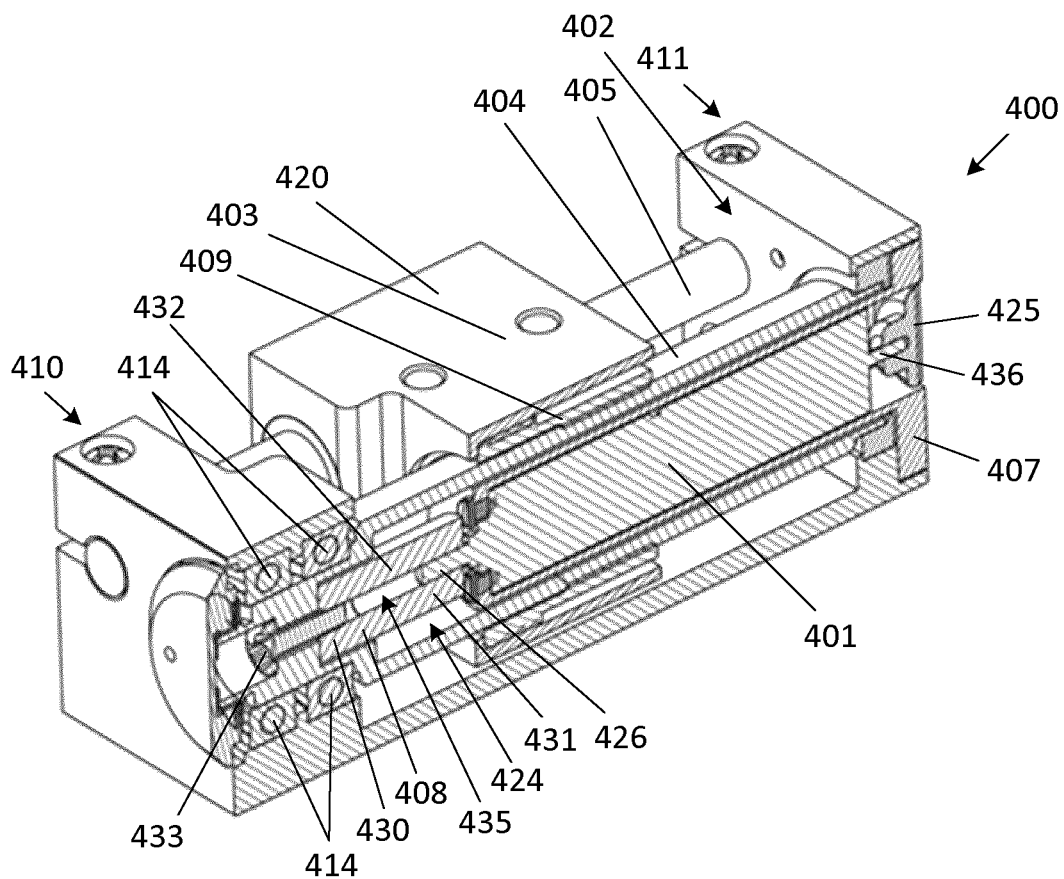
FIG. 5 is a section view of the translation stage of FIG. 4 showing the motor embedded inside the translation screw.

Referring to FIG. 3, illustrated therein is a linear translation stage 300 having a frame 302, a screw 304 and a motor 301 embedded in screw 304 (see for example motor 401 embedded in screw 404 as shown in FIG. 5).

Frame 302 has a first end 310 and a second end 311 and at least one guide 305 extending between the first end 310 and the second end 311. In FIG. 3, the at least one guide 305 is shown as two guiding rails 305 spaced apart from each other. Each of guiding rails 305 extends between the first end 310 and the second end 311. Guiding rails 305 slidably engage carriage 303 to guide translation of carriage 303 between the first end 310 and the second end 311. In the embodiment shown in FIG. 3, guiding rails 305 are mounted to a bottom surface 315 of frame 302 and a portion 320 of carriage 303 extends across each rail of guiding rails 305 to engage guiding rails 305 and guide translation of carriage 303 between first end 310 and second end 311.

Screw 304 extends between first end 310 and second end 311 of frame 302 and is disposed between guiding rails 305. Screw 304 has threads (not shown) on an outer surface 322. Outer surface 322 defines an inner volume (see for example inner volume 424 of screw 404, as shown on FIG. 5) of screw 304. Screw 304 is sized and shaped to have an inner volume that can accommodate embedding motor 301 therein.

Motor 301 is embedded in inner volume 324 (see for example inner volume 424 shown in FIG. 5 cross section view) and extends and between first end 310 and second end 311 of frame 302 between guiding rails 305. Motor 301 is fixedly coupled to frame 302 (as described below with reference to FIG. 5) and rotationally coupled to screw 304 such that, upon actuation of the motor 301 the screw 304 rotates.

Figure 4:
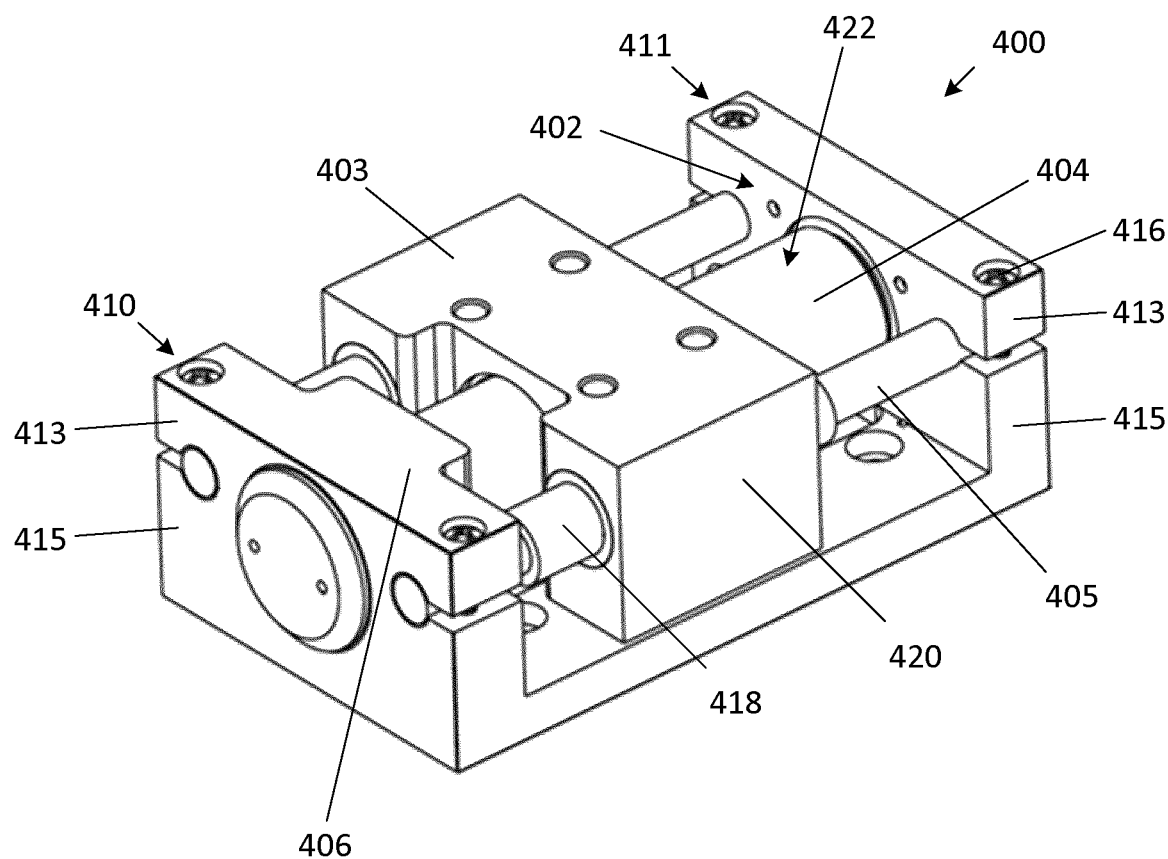
FIG. 4 is an isometric view of a translation stage having a motor embedded inside the translation screw, according to another embodiment.

Referring now to FIG. 4, illustrated therein is a translation stage 400 according to another embodiment. Translation stage 400 has a frame 402, a screw 404 and a motor 401 embedded in screw 404 (see FIG. 5).

Frame 402 has a first end 410 and a second end 411 and at least one guide 405 extending between the first end 410 and the second end 411. In FIG. 5, the at least one guide 405 is shown as two guiding rails 405 spaced apart from each other to support a carriage 403. It should be noted that reference to guiding rails 405 hereinafter does not limit the scope described herein. The guiding rails 405 of FIG. 5 are only one example of at least one guide 405.

Guiding rails 405 slidably engage carriage 403 to guide translation of carriage 403 between the first end 410 and the second end 411. In this embodiment, each rail of guiding rails 405 is clamped to first end 410 and second end 411. First end 410 and second end 411 each include a top portion 413 and a bottom portion 415 that co-operate to clamp around each of guiding rails 405. Fasteners 416 can optionally be provided to fastener top portion 413 and bottom portion 415 together upon insertion of each end of guiding rails 405 therebetween to clamp the rails 405 with the ends 410, 411 of the frame.

Screw 404 extends between first end 410 and second end 411 of frame 402 and is disposed between guiding rails 405. Screw 404 has threads (not shown) on an outer surface 422. Outer surface 422 defines an inner volume 424, as shown in FIG. 5, of screw 404. Screw 404 is sized and shaped to have an inner volume 424 that can accommodate embedding motor 401 therein.

Screw 404 is mounted on bearings 414, as shown in FIG. 5 that guides rotation of screw 404. Different types of rotation guides, such as ball bearings, roller bearings and sleeve bearings may also be used herein.

Screw 404 is rotatably coupled to carriage 403 by a leadscrew nut 409 that is fixed in the carriage 403. Leadscrew nut 409 has a threaded portion (not shown) on an inner surface thereof that co-operates with external threads of screw 404 to translate rotational motion of the rotating screw 404 to translational motion of the carriage 403. Translational motion of carriage 403 is guided by guiding rails 405 such that carriage 403 moves laterally (e.g. slides or translates) relative to the screw 404 between first end 410 and second end 411.

In some embodiments, leadscrew nut 409 comprises or is made of brass, bronze, aluminum, plastic, or any other appropriate material. Leadscrew nut 490 may optionally have an anti-backlash mechanism. The anti-backlash mechanism may be a flanged type, a straight type or a block type anti-backlash mechanism.

The screws described herein (e.g. screws 104, 204, 304, 404) may be a lead screw, a ball screw or any other appropriate type of screw for converting a rotation motion into a linear motion of carriage 403. Screw 404 may have left hand or right hand threads. The screw may have a single or a multiple starts thread. Screw 404 may have a thread profile corresponding to different standards such as but not limited to V-profile ISO, V ASME, ACME, Buttress thread, Square Thread or the like. The screw 404 may have two or more carriages having a combination of two or more different pitches, may have two or more different diameters and/or may have two or more different thread sides (i.e. left hand and right hand).

Motor 401 is embedded in inner volume 424 and also extends and between first end 410 and second end 411 of frame 402 between guiding rails 405. Motor 401 is fixedly coupled to frame 402 (as described below with reference to FIG. 5) and rotationally coupled to screw 404 such that, upon actuation of the motor 401 the screw 404 rotates.

Referring now to FIG. 5, illustrated therein is a cross-section view of the translation stage 400 from FIG. 4. In FIG. 5, motor 401 is shown as being embedded in screw 404. Motor 401 can be fixed on a motor mount 407 that is fixed on the frame 402. Motor 401 can also be fixed to frame 402 in any other appropriate manner.

Motor 401 is coupled to the screw 404 by a coupling 408. Coupling 408 may be rigid or flexible. For example, at least a portion of coupling 408 may be made from a flexible material such as but not limited to rubber, or may be made from a rigid material and comprise flexures (i.e. bent or curved portions) that cause coupling 408 to be flexible. Coupling 408 has a first portion 430 to engage a top screw 433 and a second portion 431 to engage a motor shaft 426 of motor 401.

In the embodiment shown in FIG. 5, coupling 408 generally has a body 432 having a cylindrical shape with first portion 430 spaced apart from second portion 431 to define a volume 435 therebetween. First portion 430 of coupling 408 generally surrounds and receives at least a portion of top screw 433 within volume 435. Specifically, an inner wall of first portion 430 may have threads to co-operate with threads of top screw 433 such that coupling 408 is fixed to the screw 404 such that rotation of motor shaft 426 rotates coupling 408 and the screw 404. Coupling 408 is linked to the screw 404 using the top screw 433. Second portion 431 of coupling 408 generally surrounds and receives at least a portion of motor shaft 426 that extends from motor 401 within volume 435. Second portion 431 receives motor shaft 426 such that rotation of motor shaft 426 rotates coupling 408.

In one example, coupling 408 may be a Reli-A-Flex Flexible Beam Shaft Coupling (Flexible Beam Shaft Coupling) by The Precision Alliance (Fort Mill, S.C.). In another example, coupling 408 may be a High Gain Type Coupling by NBK America LLC (King of Prussia, Pa.).

In operation, actuating motor 401 rotates the shaft 426, which rotates coupling 408. At least a portion of coupling 408 engages at least a portion of screw 404 to rotate screw 404 upon actuation of motor 401.

Motor 401 can also be optionally provided with a rear shaft 436 at second end 411 of frame 402 to provide for manual actuation of the carriage 403 via a rotation knob 425.

It should be noted that motor 401 can be a stepper motor, a DC motor, brushed or brushless, with or without encoder, with or without a gearhead, or any other appropriate type of motor.

FIG. 4 also shows a sleeve 418 positioned on a respective rail (i.e. guide) of guiding rails 405. In one embodiment, sleeve 418 may include a plurality of ball bearings (e.g. preloaded ball bearings) on an outer surface thereof. For example, each sleeve 418 can substantially surround a respective rail of guiding rails 405 and slide with respect to its respective rail of guiding rails 405. A respective portion 420 of carriage 403 extends around sleeve 418 such that sleeve 418 is positioned between its respective rail of guiding rails 405 and the portion 420. In this manner, each sleeve 418 may support a respective portion 420 of carriage 403 as carriage 403 translates along the respective rail 405. Each sleeve 418 may also reduce friction between its respective portion 420 of carriage 403 and its respective rail of guiding rails 405.

In one embodiment, translation stage 400 may provide a compact configuration for linearly translating a carriage 403. For example, in one embodiment, the translation stage 400 may have a length in a range of about 20 mm to about 100 mm, of about 30 mm to about 90 mm, of about 40 mm to about 80 mm, or of about 50 mm to about 70 mm. In another embodiment, the translation stage 400 may have a length of about 60 mm.

In another example, the translation stage 400 may have a width in a range of about 15 mm to about 60 mm, of about 15 mm to about 50 mm or of about 20 mm to about 45 mm. In another embodiment, the translation stage 400 may have a width of about 45 mm. In another embodiment, the translation stage 400 may have a width of about 35 mm.

In another example, the translation stage 400 may have a height in a range of about 10 mm to about 50 mm, of about 15 mm to about 35 mm or of about 20 mm to about 30 mm. In another embodiment, the translation stage 400 may have a height of about 25 mm.

In another example, the translation stage may have a length of about 60 mm, a width of about 35 mm and height of about 20 mm.

In another example, the translation stage may have a length of about 60 mm, a width of about 46 mm and height of about 23 mm.

A travel range of a linear stage can be defined as the distance that a carriage (e.g. carriage 403) can translate along at least one guide (e.g. guiding rails 405) of the translation stage (e.g. translation stage 400). In one example, the translation stage 400 may have a travel range in a range of about 5 mm to about 50 mm, about 15 mm to about 35 mm or of about 20 mm to about 30 mm. In another embodiment, the translation stage 400 may have a travel range of about 25 mm.

It should be noted that in some cases, it may not be possible, due to different mechanical design constraints, to fully embed the motor 401 inside the translation screw 404. In these cases, the motor 401 can be partially embedded inside the screw 404 with a portion of the motor 401 exceeding the screw 404 without departing from the scope described herein.

Figure 6:
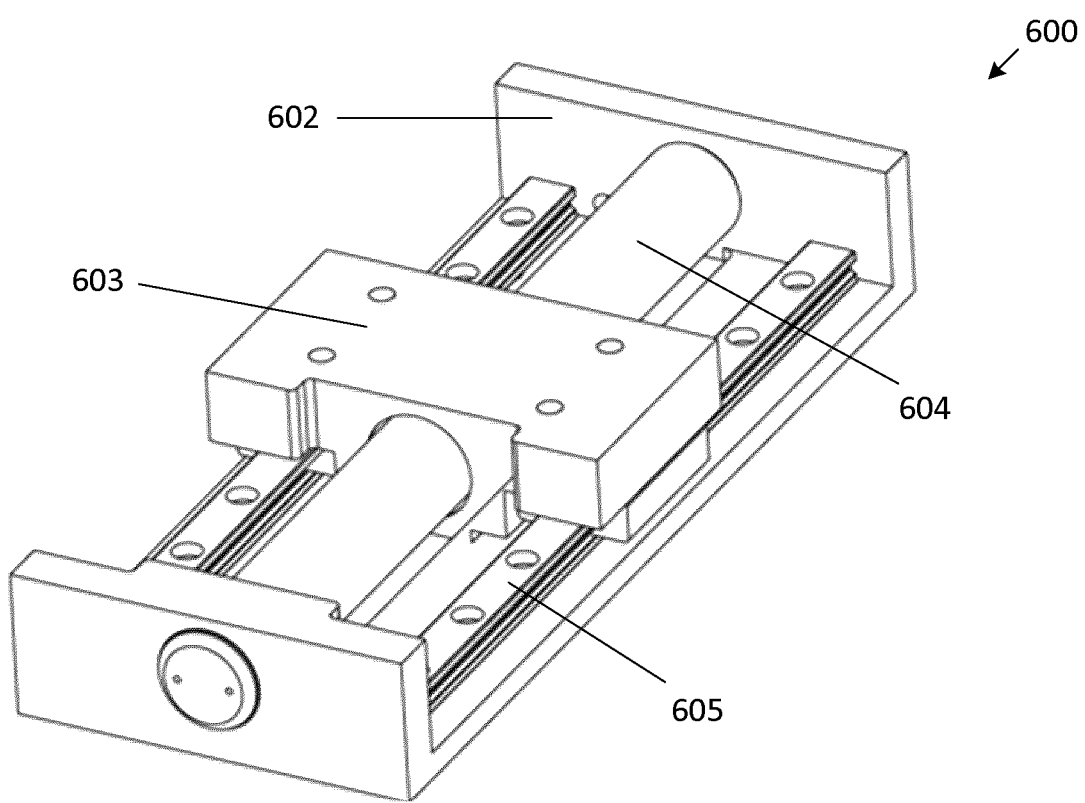
FIG. 6 is an isometric view of a translation stage having a motor embedded inside the translation screw, according to another embodiment.

Referring now to FIG. 6, illustrated therein is a translation stage 600 according to another embodiment. Translation stage 600 has a frame 602, a screw 604 and a motor 601 embedded therein. Generally, translation stage 600 is configured to be similar to translation stage 300 as shown in FIG. 3, however, translation stage 600 has a longer travel range than translation stage 400.

In some embodiments, translational stage 600 can have a travel range in a range of about 50 mm to about 250 mm. For example, in the embodiment shown in FIG. 6, translation stage 600 has a travel range in a range of about 100 mm. In other embodiments, translational stage 600 can have a travel range in a range of about 250 mm to about 500 mm or even longer.

Figure 7:
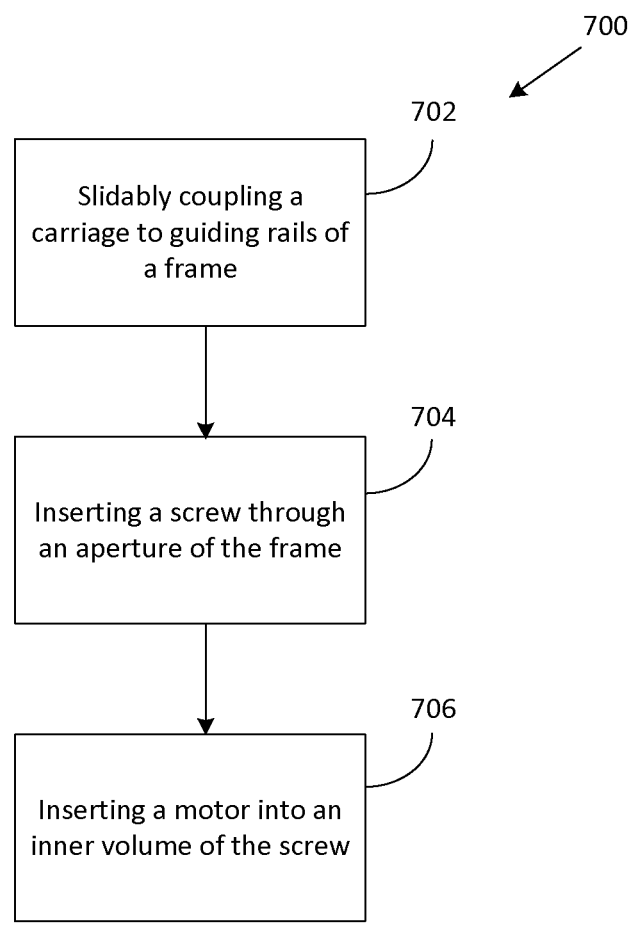
FIG. 7 is a block diagram of a method of manufacturing a linear translation stage, according to one embodiment.

Referring now to FIG. 7, illustrated therein is a method 700 of manufacturing a linear translation stage. The method 700 includes, at a first step 702, slidably coupling carriage 403 to guiding rails 405 of frame 402. In one embodiment, slidably coupling the carriage 403 to the guide rails 405 can be by inserting each of the guide rails 405 into a respective portion of the carriage 403, the respective portion of the carriage 403 defining an aperture for receiving a respective guide rail.

In one embodiment, each rail of the guiding rails 405 further engages a sleeve 418 of guiding rails 405, and step 702 of slidably coupling carriage 403 to guiding rails 405 of frame 402 includes inserting each of the guide rails 405 into a respective sleeve 418 and then inserting both of the respective sleeve 418 and its respective guide rail into a respective portion of the carriage.

At a step 704, screw 404 is rotatably coupled to frame 402. In one embodiment, screw 404 is rotatably coupled to frame 402 by inserting the screw 404 through an aperture (not shown) of the frame 402. The aperture can be positioned at second end 411 of frame 402 such that screw 404 can be inserted through the aperture and into a hub 406 positioned adjacent to first end 410. In some embodiments, the aperture of frame 402 may be positioned between guide rails 405 such that inserting the screw 404 through the aperture and into the hub 406 provides for screw 404 being disposed between the guide rails 405. In other embodiments, inserting the screw 404 through the aperture and into the hub 406 may provide for screw 404 to be disposed laterally (i.e. on a same side) of both guide rails 405. In other embodiments, the aperture of frame 402 may be positioned to provide screw 404 to extend between first end 410 and second end 411 of frame 402 generally parallel to guide rails 405.

In another embodiment of step 704, screw 404 may be provided to extend between first end 410 of the frame and second end 411 of the frame. Screw 404 may be rotatably coupled to the carriage 403 to translate the carriage 403 upon rotation of the screw 404. In this embodiment, a bearing may be inserted in an aperture of the frame 402 to guide the rotation of the screw 404.

At step 706, motor 401 is embedded inside of the screw 404 by inserting the motor into an inner volume 424 of the screw 404 through the aperture of the frame. In one embodiment, motor 401 can be coupled to the screw 404 by a coupling 408 that transfers the rotational motion of the motor 401 to the screw 404. In another embodiment, motor 401 can be fixed to the frame by, for example, by a motor mount 407.

Figure 8:
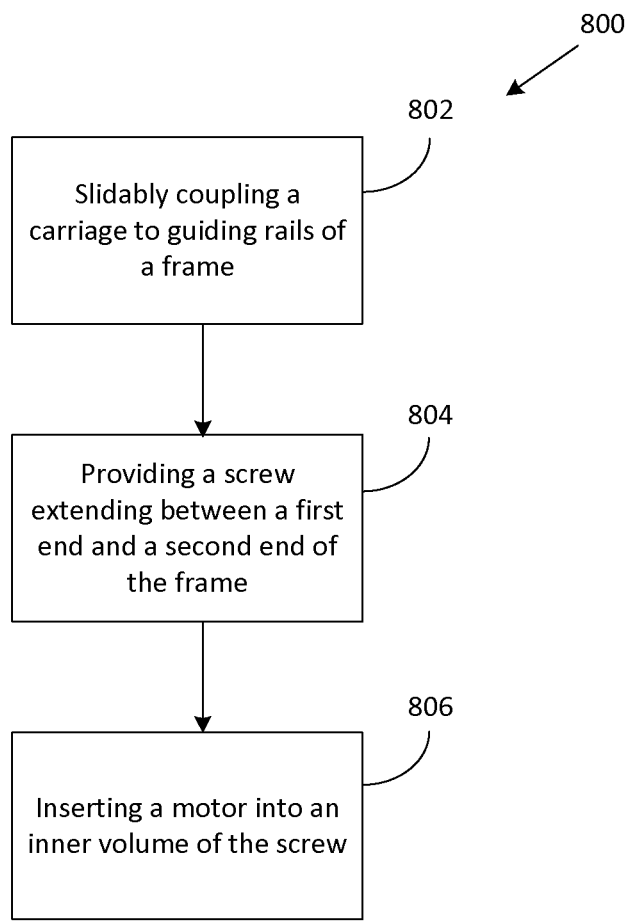
FIG. 8 is a block diagram of a method of manufacturing a linear translation stage, according to another embodiment.

Referring now to FIG. 8, illustrated therein is a method 800 of manufacturing a linear stage, according to another embodiment. The method 800 includes, at a first step 802, slidably coupling carriage 403 to guiding rails 405 of frame 402. In one embodiment, slidably coupling the carriage 403 to the guide rails 405 can be by inserting each of the guide rails 405 into a respective portion of the carriage 403.

At step 804, screw 404 is rotatably coupled to frame 402. In one embodiment, screw 404 is rotatably coupled to frame 402 by providing for screw 404 to extend between first end 410 of the frame 402 and second end 411 of the frame 402 to rotatably couple to the carriage 403 to translate the carriage 403 upon rotation of the screw 404.

At step 806, motor 401 is embedded inside of the screw 404 by inserting the motor into an inner volume 424 of the screw 404. In one embodiment, motor 401 can be coupled to the screw 404 by a coupling 408 that transfers the rotational motion of the motor 401 to the screw 404. In another embodiment, motor 401 can be fixed to the frame by, for example, a motor mount 407.

Figure 9:
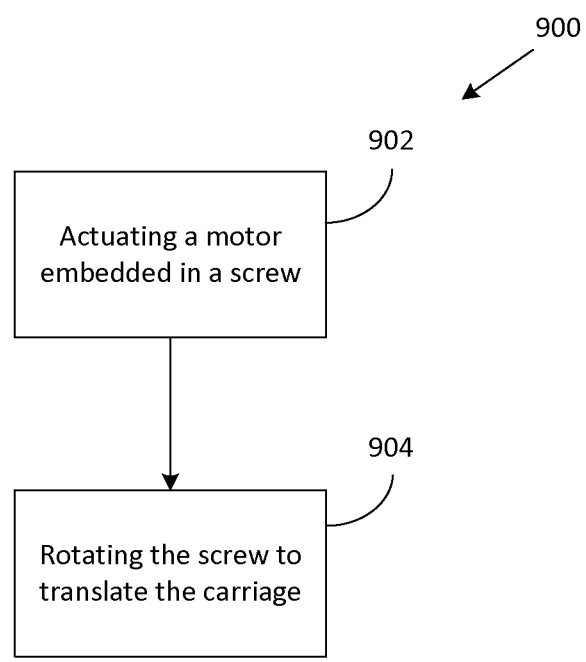
FIG. 9 is a block diagram of a method of translating a linear stage.

Referring now to FIG. 9, illustrated therein is a method 900 of translating a carriage 403 of a linear translation stage 400. Method 900 includes, at a first step 902, actuating motor 401. As noted above, motor 401 is embedded in screw 404 and rotatably coupled to screw 404 by a coupling 408 that transfer the rotation motion of the shaft 426 of the motor 401 to the screw 404.

At step 904, the screw 404 is rotated by the actuation of motor 401. Outer surface 422 of the screw 404 has threads that co-operate with threads on an inner surface of lead screw nut 409. Lead screw nut 409 is fixedly attached to carriage 403 such that rotation of screw 404 results in translation of the carriage 403 between the first 410 and second 411 ends of the frame 402.

While the above description provides examples of one or more apparatus, methods, or systems, other apparatus, methods, or systems may be within the scope of the claims as interpreted by one of skill in the art.

What is claimed is:

1. A linear translation stage comprising:
   a frame having:
      a first end and a second end;
      at least one guide extending between the first end and the second end; and
      a carriage slidably coupled to the at least one guide;
   a motor fixed to the frame; and
   a screw having threads on an outer surface thereof, the outer surface defining an inner volume of the screw, the screw being rotationally coupled to the motor and threadingly engaged with the carriage by a nut;
   wherein the motor is embedded in the inner volume of the screw and the screw rotates upon actuating the motor to translate the carriage relative to the frame between the first end and the second end.

2. The linear translation stage of claim 1, wherein the screw is rotationally coupled to the motor by a coupling.

3. The linear translation stage of claim 2, wherein at least a portion of the coupling is configured to surround an outer surface of a shaft of the motor.

4. The linear translation stage of claim 3, wherein the coupling is configured to rotate with rotation of the shaft of the motor.

5. The linear translation stage of claim 4, wherein the coupling is flexible by use of flexures or a flexible material.

6. The linear translation stage of claim 1, wherein the screw is mounted on bearings that guide the rotational motion of the screw upon actuating the motor.

7. The linear translation stage of claim 6, wherein the at least one guide is composed of two rails spaced apart from each other.

8. The linear translation stage of claim 7, wherein the nut is fixed to the carriage and converts rotational motion of the screw into translation of the carriage.

9. The linear translation stage of claim 8, wherein the nut has threads that are complementary to the threads on the outer surface of the screw.

10. The linear translation stage of claim 9, wherein the motor is partially embedding in the inner volume of the screw.

11. The linear translation stage of claim 10, wherein the motor is one of a stepper motor, a DC motor, brushed or brushless, with or without encoder, with or without a gearhead.

12. The linear translation stage of claim 1, wherein the at least one guide is a cross roller bearing, a linear ball bearing, a ball cage or a rod bearing.

13. The linear translation stage of claim 1, wherein the screw is a lead screw or a ball screw for converting rotational motion of the screw into linear motion of the carriage.

14. The linear translation stage of claim 1, wherein the screw has a Unified National (UN), ISO 60 degrees V-shaped, ACME, trapezoidal buttress, square, or Whitworth thread profile.

15. The linear translation stage of claim 1, wherein the screw has a combination of two or more different pitches, two or more different diameters, or two different thread sides used with two or more carriages moved under the rotation of the screw.

16. The linear translation stage of claim 1, wherein the carriage has a travel of about 5 mm to about 50 mm.

17. The linear translation stage of claim 16, wherein the linear translation stage has a length in a range of about 20 mm to about 100 mm.

18. The linear translation stage of claim 17, wherein the linear translation stage has a width in a range of about 15 mm to about 50 mm.

19. The linear translation stage of claim 18, wherein the linear translation stage has a height in a range of about 10 mm to 50 mm.

* * * * *